United States Patent
LeCrone et al.

(10) Patent No.: US 11,513,687 B2
(45) Date of Patent: Nov. 29, 2022

(54) ACCESSING STORAGE SPACE OF A PHYSICAL DATA FRAGMENT IN A STORAGE SYSTEM

(71) Applicant: EMC IP Holding Company LLC, Hopkinton, MA (US)

(72) Inventors: Douglas E. LeCrone, Hopkinton, MA (US); Jeremy J. O'Hare, Westborough, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 32 days.

(21) Appl. No.: 17/084,191

(22) Filed: Oct. 29, 2020

(65) Prior Publication Data

US 2022/0137822 A1    May 5, 2022

(51) Int. Cl.
*G06F 12/00* (2006.01)
*G06F 3/06* (2006.01)
*G06F 21/60* (2013.01)

(52) U.S. Cl.
CPC ............ *G06F 3/0608* (2013.01); *G06F 3/064* (2013.01); *G06F 3/0686* (2013.01); *G06F 21/602* (2013.01)

(58) Field of Classification Search
CPC ...... G06F 3/0608; G06F 3/064; G06F 3/0686; G06F 21/602
USPC .......................................................... 711/112
See application file for complete search history.

(56) References Cited

U.S. PATENT DOCUMENTS

| | | | | |
|---|---|---|---|---|
| 6,735,650 B1* | 5/2004 | Rothberg | .............. | G06F 3/0661 710/5 |
| 7,281,157 B2* | 10/2007 | LeCrone | ............. | G06F 11/2064 714/6.1 |
| 7,734,888 B1* | 6/2010 | Hamilton | .............. | G06F 3/0631 711/170 |
| 10,372,345 B1* | 8/2019 | LeCrone | ............. | G06F 12/0895 |
| 11,256,447 B1* | 2/2022 | Pang | ........................ | G06F 3/067 |
| 2005/0138265 A1* | 6/2005 | Nguyen | ............... | G11B 27/105 |

\* cited by examiner

*Primary Examiner* — Mardochee Chery
(74) *Attorney, Agent, or Firm* — Muirhead and Saturnelli, LLC (57) ABSTRACT

Accessing additional storage space of a storage system includes reading a physical data fragment that is an incremental subset of a physical storage unit of the storage system, accessing metadata corresponding to logical blocks stored on the physical data fragment to determine a sidebar storage portion of the physical data fragment that is unused by the logical blocks, and accessing data of the sidebar storage portion. Accessing data of the sidebar storage portion may include providing data from the sidebar storage portion to a calling process. Accessing data of the sidebar storage portion may include modifying a portion of data from the physical data fragment and writing the physical data fragment back to the physical storage device. The physical data fragment may be locked prior to reading the physical data fragment and the physical data fragment may be unlocked after writing the physical data fragment.

21 Claims, 4 Drawing Sheets

ACCESSING STORAGE SPACE OF A PHYSICAL DATA FRAGMENT IN A STORAGE SYSTEM

TECHNICAL FIELD

This application relates to the field of computer systems and storage systems therefor and, more particularly, to the field of accessing data for storage systems.

BACKGROUND OF THE INVENTION

Host processor systems may store and retrieve data using a storage system containing a plurality of host interface units (I/O modules), physical storage units (e.g., disk drives), and disk interface units (disk adapters). The host systems access the storage systems through a plurality of channels provided therewith. Host systems provide data and access control information through the channels to the storage system and the storage system provides data to the host systems also through the channels. The host systems do not address the physical storage units directly, but rather, access what appears to the host systems as a plurality of logical volumes or logical devices. The logical devices may or may not correspond to any one of the physical storage units. Allowing multiple host systems to access the single storage system allows the host systems to share data stored therein among different host processor systems.

Logical blocks used for data storage often do not correspond to a size of physical data fragments used for a physical storage unit, such as a disk drive. For example, in the case of CKD storage, logical blocks may have variable sizes and a single logical block does not span multiple physical tracks of a disk drive. Thus, a physical track could include unused physical storage space that does not contain data for any logical blocks. Of course, the amount of unused physical storage space on a physical track of a CKD storage device depends on the size chosen for logical blocks, but for a relatively large physical storage system, the amount of unused space can be substantial. For example, a 100 TB storage system could have over 300 GB of unused storage space.

Accordingly, it is desirable to provide a mechanism for using the unused storage space of a storage system.

SUMMARY OF THE INVENTION

According to the system described herein, accessing additional storage space of a storage system includes reading a physical data fragment that is an incremental subset of a physical storage unit of the storage system, accessing metadata corresponding to logical blocks stored on the physical data fragment to determine a sidebar storage portion of the physical data fragment that is unused by the logical blocks, and accessing data of the sidebar storage portion. Accessing data of the sidebar storage portion may include providing data from the sidebar storage portion to a calling process. Accessing data of the sidebar storage portion may include modifying a portion of data from the physical data fragment and writing the physical data fragment back to the physical storage device. The physical data fragment may be locked prior to reading the physical data fragment and the physical data fragment may be unlocked after writing the physical data fragment. The data for the sidebar storage may be encrypted. The physical storage unit may be a disk drive and the physical data fragment may be a track of the disk drive. The physical storage unit may store CKD data and the logical blocks may have variable size. A size of the sidebar storage portion may be less than a size of a block.

According further to the system described herein, a non-transitory computer readable medium contains software that accesses additional storage space of a storage system. The software includes executable code that reads a physical data fragment that is an incremental subset of a physical storage unit of the storage system, executable code that accesses metadata corresponding to logical blocks stored on the physical data fragment to determine a sidebar storage portion of the physical data fragment that is unused by the logical blocks, and executable code that accesses data of the sidebar storage portion. Accessing data of the sidebar storage portion may include providing data from the sidebar storage portion to a calling process. Accessing data of the sidebar storage portion may include modifying a portion of data from the physical data fragment and writing the physical data fragment back to the physical storage device. The physical data fragment may be locked prior to reading the physical data fragment and the physical data fragment may be unlocked after writing the physical data fragment. The data for the sidebar storage may be encrypted. The physical storage unit may be a disk drive and the physical data fragment may be a track of the disk drive. The physical storage unit may store CKD data and the logical blocks may have variable size. A size of the sidebar storage portion may be less than a size of a block.

According further to the system described herein, a storage system includes a plurality of physical storage units that contain data for the storage system, a processor, and a non-transitory computer readable medium containing executable code that reads a physical data fragment that is an incremental subset of one of the physical storage units of the storage system, executable code that accesses metadata corresponding to logical blocks stored on the physical data fragment to determine a sidebar storage portion of the physical data fragment that is unused by the logical blocks, and executable code that accesses data of the sidebar storage portion. The data for the sidebar storage may be encrypted. The physical storage unit may be a disk drive and the physical data fragment may be a track of the disk drive and the physical storage unit may store CKD data and the logical blocks may have variable size. A size of the sidebar storage portion may be less than a size of a block.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism for access (reading and writing) otherwise unused storage space of a storage system. An API is used to read and write an entire physical data fragment of a physical storage unit (e.g., an entire track of a physical disk drive). The system may then determine which parts of the entire track correspond to conventional logical block I/O operations (by, for example, examining metadata for conventional I/O operations). Otherwise unused storage space may then be accessed by reading or writing portions of the entire physical track that do not correspond to data for conventional logical block I/O operations.

Figure 1:
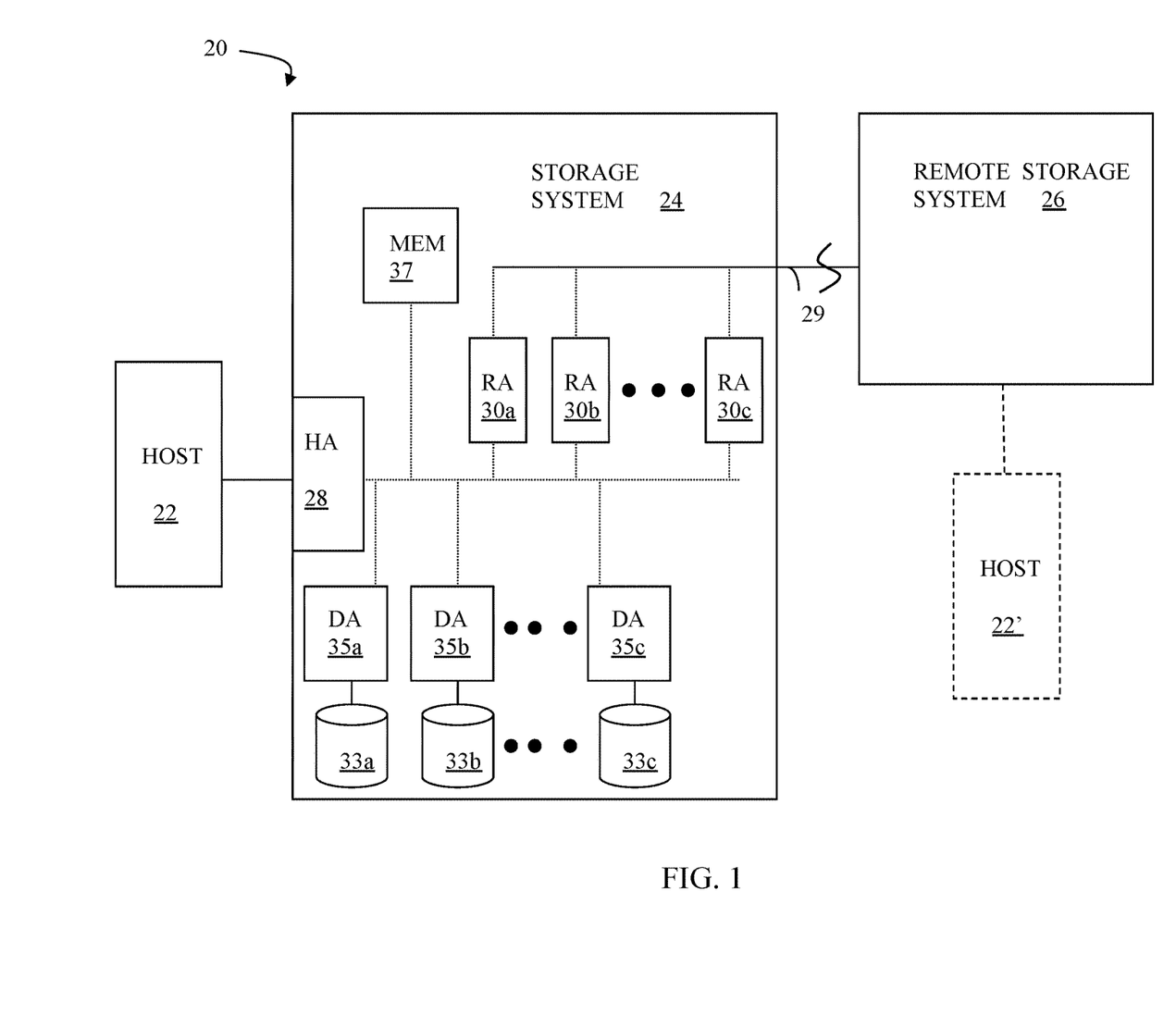
FIG. 1 is a schematic diagram showing a relationship between hosts and storage systems according to an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
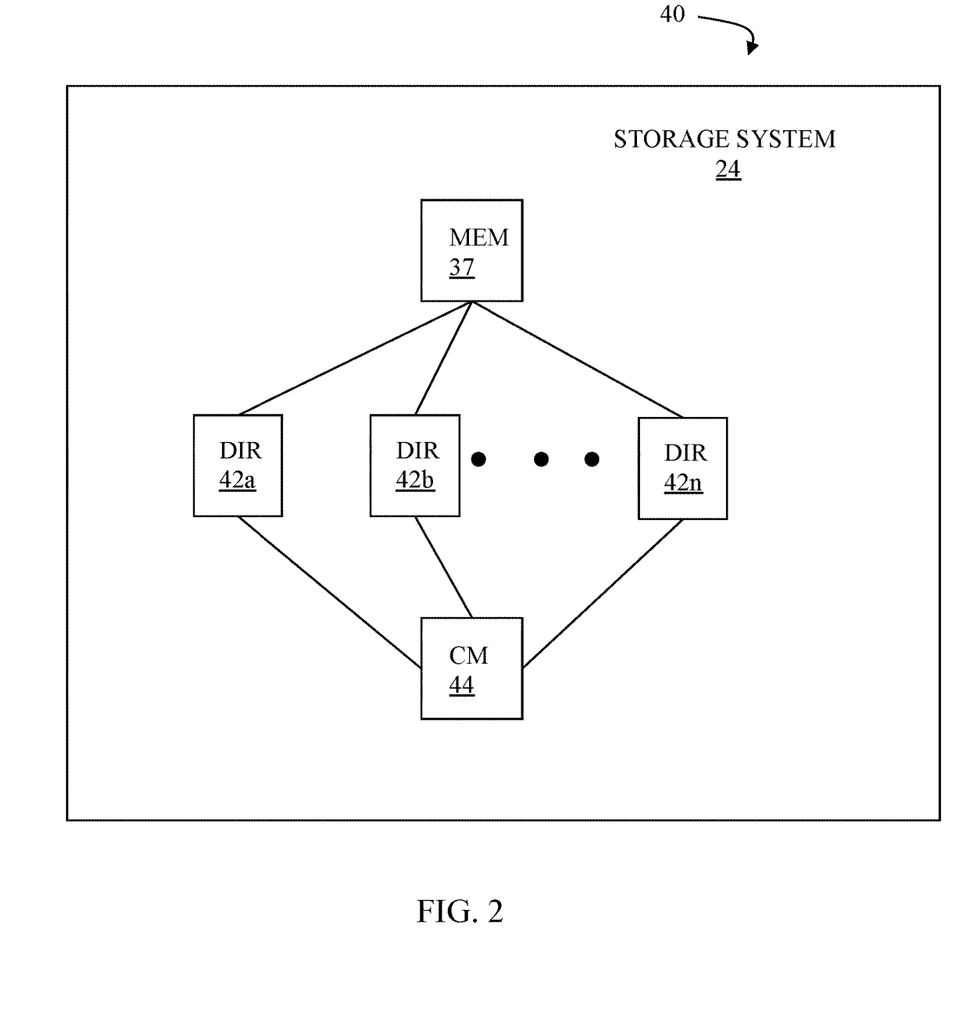
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
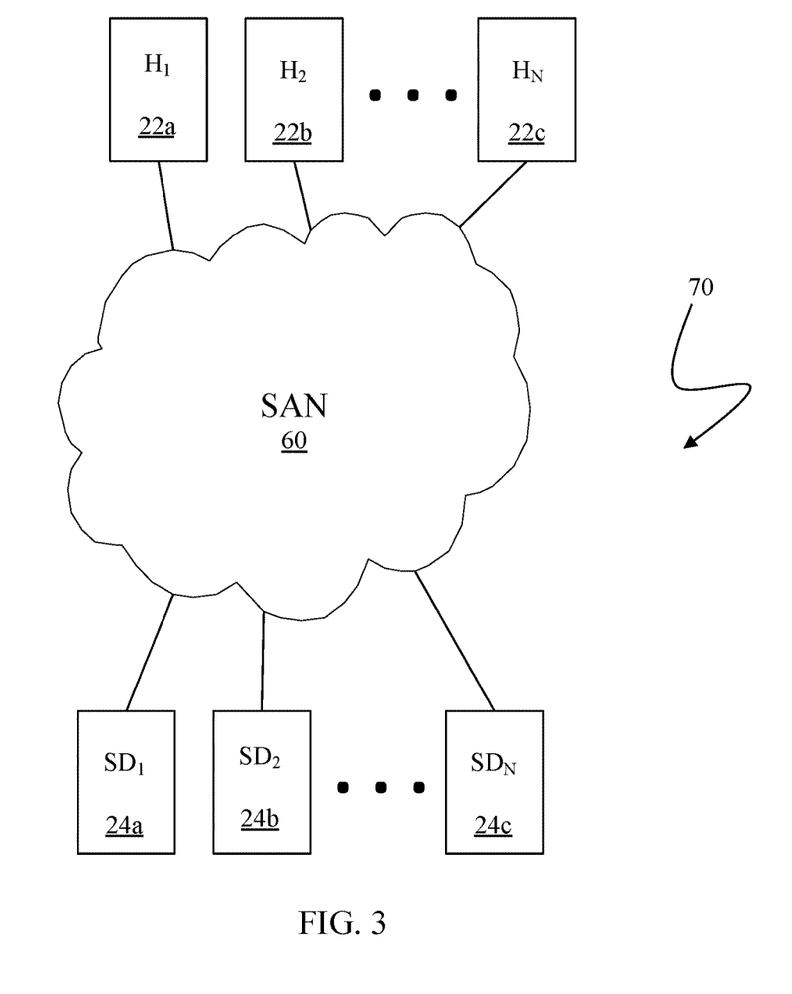
FIG. 3 is a schematic diagram showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage systems, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4:
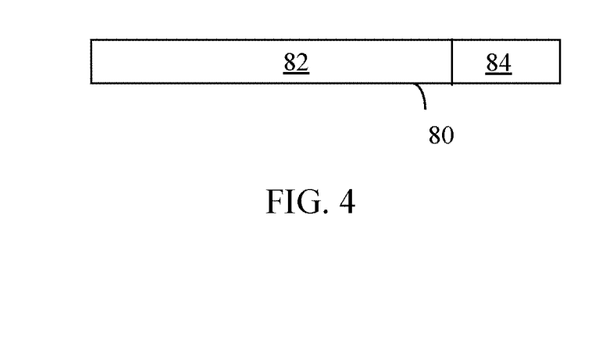
FIG. 4 is a schematic diagram showing a physical data fragment of a physical storage unit according to an embodiment of the system described herein.

Referring to FIG. 4, a diagram illustrates a physical data fragment 80 of one of the physical storage units 33a-33c. The physical data fragment 80 may be any incremental subset of a physical storage device. For example, if the physical storage device is a disk drive, the physical data fragment 80 may be a physical track of the disk drive. On a physical disk drive, a physical track may correspond to all data stored at a fixed radius from the center of the platter (i.e., all data in a single ring on the platter). Of course, in other cases, a physical track may correspond to one or more different physical portions of the platter. Similarly, for other types of physical storage units, a physical track (or other physical data fragment) may be allocated to a particular physical segment of the physical storage unit.

Data storage also uses logical blocks, which often do not correspond to a size of physical data fragments used for a physical storage unit. For example, in the case of CKD storage, logical blocks may have variable sizes and a single logical block does not span multiple physical tracks of a disk drive. Thus, a physical track could include unused physical storage space that does not contain data for any logical blocks. Of course, the amount of unused physical storage space on a physical track of a CKD storage device depends on the size chosen for logical blocks. The physical data fragment 80 is shown with a portion 82 used for logical block(s) and a sidebar storage portion 84, which is not used for logical blocks and thus is generally not accessible by conventional low level I/O operations that read and write logical blocks on the physical data fragment 80 (e.g., physical track of a disk drive). In many cases, the sidebar storage portion 84 may simply be too small to contain a conventional logical block. Moreover, conventional low level drivers that access the storage system may access data according to logical blocks. Thus, the sidebar storage portion 84 may be unreachable by conventional low level drivers. The system described herein provides a number of mechanisms to store and retrieve data in the sidebar storage portion 84 and other similar otherwise unused portions of a physical storage device.

Figure 5:
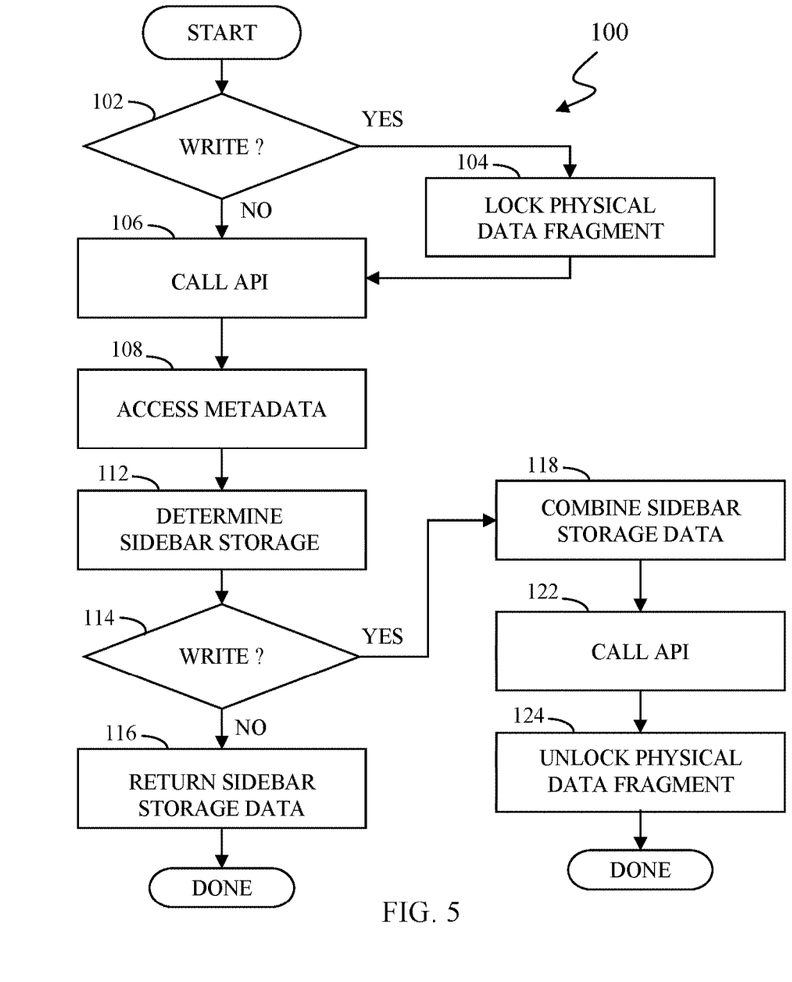
FIG. 5 is a flow diagram illustrating processing performed in connection with accessing otherwise unused storage space according to an embodiment of the system described herein.

Referring to FIG. 5, a flow diagram 100 illustrates processing performed in connection with accessing an unused portion of a physical data fragment. In the system described herein, an API is provided to read and write an entire physical data fragment from a physical storage unit, such as reading an entire track from a disk drive. The specific mechanism used to read and write an entire physical data fragment may depend upon the specific hardware used for the physical storage unit, and may in fact vary depending upon manufacturer and model. The API may be provided at the storage system and may be called in response to either a specific command from a host or in response to a different process on the storage system that may, for example, aggregate separate sidebar storage portions and present a single logical storage entity for access by a host.

Processing begins at a first test step 102 where it is determined if the access operation is a read or a write operation. Note that the processing illustrated by the flow diagram 100 may be occurring concurrently with processing of conventional data accesses of, for example, portions of a physical data fragment containing logical blocks. Thus, if the access operation is a write operation, control transfers from the test step 102 to a step 104 where the physical data fragment (e.g., a track of a disk drive) is locked to prevent concurrent write access by any other processes, including processes performing convention I/O operations. Following the step 104 is a step 106 where a physical data fragment API (described elsewhere herein) is called to read the entire physical data fragment. Note that the step 106 is reached directly from the step 102 if the access to sidebar storage portion is a read operation.

Following the step 106 is a step 108 where conventional file system metadata is accessed to determine which parts of the physical data fragment are used by the conventional file system (i.e., the portion 82 used for logical block(s) discussed in connection with FIG. 4). Following the step 108 is a step 112 where a sidebar storage portion of the physical data fragment is determined using the entire physical data fragment obtained at the step 106 and a portion of the physical data fragment containing conventional data (determined by the metadata obtained at the step 108). Generally, the sidebar storage portion corresponds to the entire physical data fragment minus the part used for logical blocks by the conventional storage system. Following the step 112 is a test step 114 where it is determined if a write access operation is being performed (like the step 102). If not, then control transfers from the test step 114 to a step 116 where data from the sidebar storage portion (determined at the step 112) is returned to a calling process. Following the step 116, processing is complete.

If it is determined at the step 114 that a write access operation is being performed, then control transfers from the test step 114 to a step 118 where the data being written in the sidebar storage portion is combined with the conventional data from the physical data fragment (determined by the metadata obtained at the step 108) to reassemble the entire physical data fragment revised (written) data for the sidebar storage portion. Following the step 118 is a step 122 where a physical data fragment API (described elsewhere herein) is called to write the entire physical data fragment. Following the step 122 is a step 124 where the physical data fragment is unlocked to allow write operations by other processes, including conventional I/O processes. Following the step 124, processing is complete.

Note that, in embodiments where an entire physical data fragment (e.g., physical disk track) is read and written, conventional I/O operations will preserve any sidebar storage portions whenever writing data. That is, writing conventional data may include not overwriting or otherwise changing sections of physical data fragments that are not used by conventional I/O operations since those sections may contain sidebar storage data.

In other embodiments, the physical storage unit may be accessible in small increments (byte level) so that the sidebar storage portion may be accessed directly without accessing any part of the physical data fragment used for conventional I/O operations. In some instances, the sidebar storage may be accessed using control commands provided by the host to the data storage system. Thus, conventional data transfer commands may be used for accessing conventional data on the storage system while control commands may be used for accessing sidebar storage portions.

There are many possible uses for the sidebar storage. The sidebar storage portions of a physical storage unit may be aggregated by higher level processes and presented to a host as a single logical device or a plurality of logical devices. In such a case, data structures may be provided at the host and/or at the storage system to present a plurality of separate sidebar storage data sections as a single continuous data section, such as, for example, a complete CKD track. The host may access the CKD track in the same way that the host accesses conventional CKD tracks so that a conventional CKD track and a CKD track that is an aggregation of sidebar storage portions are indistinguishable.

Another possibility is to use the sidebar storage for metadata for operations like audit, adding job information to an extent range to specifically identify, for example, of an application job and user that updated a range of tracks, which could be useful for checkpoint/restart processing. The sidebar storage may be used for Reliability, Availability, and Serviceability (RAS) to identify phases at a more granular level than conventional mechanisms to help identify a point of failure when issues occur and to aid restores. The sidebar storage could also be used for migrations to hold an update bit map and may generally be used to store data to improve tracking capability of conventional data on the physical data fragment. In some instances, the sidebar storage may be used to store data that is otherwise inaccessible using the conventional I/O system. During replication operations, the sidebar storage data may not be replicated since it is not accessible to conventional replication routines. Also, the sidebar storage data may be encrypted for enhanced security.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of accessing additional storage space of a storage system, comprising:
   reading a physical data fragment that is an incremental subset of a physical storage unit of the storage system, wherein the physical data fragment includes data for variable size logical blocks of the storage system and includes a separate sidebar storage that corresponds to a portion of the physical data fragment that is not allocated for storage space for the logical blocks;
   accessing metadata corresponding to the logical blocks stored on the physical data fragment to determine data for the sidebar storage portion of the physical data fragment that is unused by the logical blocks;
   accessing data of the sidebar storage portion;
   modifying the data for the sidebar storage portion;
   combining the data for the sidebar storage portion with data for the logical blocks to provide data for an entire portion of the physical data fragment; and
   writing the data for the entire portion of the physical data fragment.

2. A method, according to claim 1, wherein accessing data of the sidebar storage portion includes providing data from the sidebar storage portion to a calling process.

3. A method, according to claim 1, wherein the physical data fragment is locked prior to reading the physical data fragment and the physical data fragment is unlocked after writing the data for the physical data fragment.

4. A method, according to claim 1, wherein the data for the sidebar storage is encrypted.

5. A method, according to claim 1, wherein the physical storage unit is a disk drive and the physical data fragment is a track of the disk drive.

6. A method, according to claim 5, wherein the physical storage unit stores CKD count key data formatted data.

7. A method, according to claim 1, wherein a size of the sidebar storage portion is less than a size of a logical block.

8. A method, according to claim 1, wherein I/O operations that access the logical blocks preserve sidebar storage whenever the I/O operations overwrite the logical blocks.

9. A non-transitory computer readable medium containing software that accesses additional storage space of a storage system, the software comprising:
   executable code that reads a physical data fragment that is an incremental subset of a physical storage unit of the storage system, wherein the physical data fragment includes data for variable size logical blocks of the storage system and includes a separate sidebar storage that corresponds to a portion of the physical data fragment that is not allocated for storage space for the logical blocks;
   executable code that accesses metadata corresponding to the logical blocks stored on the physical data fragment to determine data for the sidebar storage portion of the physical data fragment that is unused by the logical blocks;
   executable code that accesses data of the sidebar storage portion;
   executable code that modifies the data for the sidebar storage portion;
   executable code that combines the data for the sidebar storage portion with data for the logical blocks to provide data for an entire portion of the physical data fragment; and
   executable code that writes the data for the entire portion of the physical data fragment.

10. A non-transitory computer readable medium, according to claim 9, wherein accessing data of the sidebar storage portion includes providing data from the sidebar storage portion to a calling process.

11. A non-transitory computer readable medium, according to claim 9, wherein the physical data fragment is locked prior to reading the physical data fragment and the physical data fragment is unlocked after writing the data for the physical data fragment.

12. A non-transitory computer readable medium, according to claim 9, wherein the data for the sidebar storage is encrypted.

13. A non-transitory computer readable medium, according to claim 9, wherein the physical storage unit is a disk drive and the physical data fragment is a track of the disk drive.

14. A non-transitory computer readable medium, according to claim 13, wherein the physical storage unit stores CKD count key data formatted data.

15. A non-transitory computer readable medium, according to claim 9, wherein a size of the sidebar storage portion is less than a size of a logical block.

16. A non-transitory computer readable medium, according to claim 9, wherein I/O operations that access the logical blocks preserve sidebar storage whenever the I/O operations overwrite the logical blocks.

17. A storage system, comprising:
   a plurality of physical storage units that contain data for the storage system;
   a processor; and
   a non-transitory computer readable medium containing executable code that reads a physical data fragment that is an incremental subset of a physical storage unit of the storage system, wherein the physical data fragment includes data for variable size logical blocks of the storage system and includes a separate sidebar storage that corresponds to a portion of the physical data fragment that is not allocated for storage space for the logical blocks, executable code that accesses metadata corresponding to the logical blocks stored on the physical data fragment to determine data for the sidebar storage portion of the physical data fragment that is unused by the logical blocks, executable code that accesses data of the sidebar storage portion, executable code that modifies the data for the sidebar storage portion, executable code that combines the data for the sidebar storage portion with data for the logical blocks to provide data for an entire portion of the physical data fragment, and executable code that writes the data for the entire portion of the physical data fragment.

18. A storage system, according to claim 17, wherein the data for the sidebar storage is encrypted.

19. A storage system, according to claim 17, wherein the physical storage unit is a disk drive and the physical data fragment is a track of the disk drive and wherein the physical storage unit stores CKD count key data formatted data.

20. A storage system, according to claim 17, wherein a size of the sidebar storage portion is less than a size of a logical block.

21. A storage system, according to claim 17, wherein I/O operations that access the logical blocks preserve sidebar storage whenever the I/O operations overwrite the logical blocks.

\* \* \* \* \*

UNITED STATES PATENT AND TRADEMARK OFFICE
CERTIFICATE OF CORRECTION

| | |
|---|---|
| PATENT NO. | : 11,513,687 B2 |
| APPLICATION NO. | : 17/084191 |
| DATED | : November 29, 2022 |
| INVENTOR(S) | : Le Crone et al. |

It is certified that error appears in the above-identified patent and that said Letters Patent is hereby corrected as shown below:

In the Claims

Column 10, Line 26:
In Claim 14, the phrase "CKD count key data formatted data" should read -- count key data formatted data --

Signed and Sealed this
Fourteenth Day of February, 2023

Katherine Kelly Vidal
*Director of the United States Patent and Trademark Office*